United States Patent [19]

Miya

[11] Patent Number: 6,081,547
[45] Date of Patent: Jun. 27, 2000

[54] CDMA COMMUNICATION SYSTEM

[75] Inventor: Kazuyuki Miya, Kawasaki, Japan

[73] Assignee: Matsushita Electric Industrial Co., Ltd., Osaka, Japan

[21] Appl. No.: 08/912,197

[22] Filed: Aug. 18, 1997

[30]     Foreign Application Priority Data

Aug. 20, 1996  [JP]  Japan .................................. 8-218205

[51] Int. Cl.⁷ ..................................................... H04K 1/00
[52] U.S. Cl. .......................... 375/130; 375/148; 375/150; 375/367; 370/342
[58] Field of Search ..................................... 375/200, 206, 375/208, 202, 130, 132, 140, 142, 148, 150, 354, 367; 370/208, 320, 335, 342

[56]              References Cited

U.S. PATENT DOCUMENTS

| 4,193,030 | 3/1980 | Rabow et al. ........................... 375/202 |
| 5,109,390 | 4/1992 | Gilhousen et al. ....................... 370/335 |
| 5,608,722 | 3/1997 | Miller ..................................... 370/320 |
| 5,654,979 | 8/1997 | Levin et al. ............................. 375/206 |
| 5,737,327 | 4/1998 | Ling et al. ............................... 370/335 |
| 5,757,767 | 5/1998 | Zehavi .................................... 370/208 |
| 5,812,593 | 9/1998 | Kaku ....................................... 375/208 |

FOREIGN PATENT DOCUMENTS 6014008  1/1994  Japan .

OTHER PUBLICATIONS

A Space–Path Hybrid Diversity Scheme for Base–Station Reception in CDMA Mobile by Y. Karasawa et al; Technical report of IEICE.; May 1993.

*Primary Examiner*—Stephen Chin
*Assistant Examiner*—Chieh M. Fan
*Attorney, Agent, or Firm*—Lowe Hauptman Gopstein Gilman & Berner

[57]              ABSTRACT

A CDMA communication system comprises: N antennas, arranged for space diversity receiving, for receiving a CDMA direct conversion radio wave signal including data to respectively generate N reception CDMA signals; a searching circuit for searching a phase of PN code in one of the N reception CDMA signals; N phase tracking circuits having N correlation detectors for tracking phases of the PN codes in the N reception CDMA signals in accordance with the searched phase to generate phase information of the PN codes, respectively; N de-spreading circuits for de-spreading the N received CDMA direct conversion signals in accordance with the phase information, respectively; and a diversity combining circuit for combining outputs of the N de-spreading circuits to provide the space diversity receiving to output the combined signal. A switch may be further provided for successively selecting one of the N reception CDMA signals periodically and supplying one of the N reception CDMA direct conversion signals to the searching circuit. The phase information is generated in various ways. For example, the larger amounts of in-phase points than a reference are used.

16 Claims, 13 Drawing Sheets

CDMA COMMUNICATION SYSTEM

BACKGROUND OF THE INVENTION

1. Field of the Invention

This invention relates to a CDMA communication system for receiving a direct conversion CDMA radio wave signal having a plurality of antennas arranged for a space diversity receiving.

2. Description of the Prior Art

A CDMA (Code Division Multiple Access) communication system for receiving a direct conversion CDMA radio wave signal having a plurality of antennas arranged for a space diversity receiving is known. A diversity synthesis circuit for spread spectrum communication is disclosed in Japanese patent application provisional publication No. 6-14008. In such a prior art diversity synthesis circuit, a spectrum spreading signal is received by an antenna and is demodulated by a plurality of demodulators and the diversity synthesis circuit synthesizes the outputs of the demodulators. Moreover, "A Space-Path Hybrid Diversity Scheme for Base-Station Reception in CDMA Mobile Radio Communication Systems" is disclosed by Yoshio KARASAWA, Hisato IWAI, and Takayasu SHIOKAWA in TECHNICAL REPORT OF IEICE. A P93-29, SAT 93-12(1993–5) at pages 41–47 published by THE INSTITUTE OF ELECTRONICS, INFORMATION AND COMMUNICATION ENGINEERS. In that paper, a hybrid RAKE receiver for reducing multipath fading at a base station is disclosed which comprises N antennas, N correlators supplied with spreading codes, N Tapped Delay Lines with weighting functions, and a combining circuit, wherein the fading affection is reduced by the hybrid diversity (space diversity and the path diversity). FIG. 12 is a block diagram of such a prior art RAKE receiver.

SUMMARY OF THE INVENTION

The aim of the present invention is to provide an improved CDMA communication system.

According to the present invention, a first CDMA communication system is provided, which comprises: N antennas, arranged for space diversity receiving, for receiving a CDMA direct conversion radio wave signal including data to respectively generate N reception CDMA signals, the N being a natural number; a searching circuit for searching a phase of PN code in one of the N reception CDMA signals; N phase tracking circuits having N correlation detectors for tracking phases of the PN codes in the N reception CDMA signals in accordance with the searched phase to generate phase information of the PN codes, respectively; N de-spreading circuits for de-spreading the N reception CDMA signals in accordance with the phase information, respectively; and a diversity combining circuit for combining outputs of the N de-spreading circuits to provide the space diversity receiving to output the combined signal including the data.

The first CDMA communication system may further comprise, as a second CDMA communication system, a switch for successively selecting one of the N reception CDMA signals periodically and supplying one of the N reception CDMA direct conversion signals to the searching circuit.

In the first CDMA communication system, each of the N phase tracking circuits comprises a comparing circuit for comparing an output of the correlation detector thereof with a predetermined level and an outputting circuit for outputting the phase information when a level of the output exceeds the predetermined level.

In the first CDMA communication system, each of the N phase tracking circuits comprises an in-phase point detection circuit for detecting in-phase points in an output of the correlation detector thereof, a max detector for detecting one of the in-phase points having a largest amount of the output of the correlation detector thereof, a reference level generation circuit for generating a reference level from a predetermined ratio and the largest amount, a comparing circuit for comparing amounts of the output of the correlation detector thereof at the in-phase points with the reference level, and an outputting circuit for generating the phase information including the in-phase points showing that the amounts of the outputs of the correlation detectors are larger than the reference level.

In the first CDMA communication system, each of the N phase tracking circuits comprises an in-phase point detection circuit for detecting in-phase points and amounts of an output of the correlation detector thereof, and the CDMA communication system may further comprise a comparing circuit for comparing the amounts of the outputs of the correlation detectors of the N phase tracking circuits, and an outputting circuit for outputting the phase information of a predetermined number of the in-phase points showing that the amounts of the outputs of the correlation detectors are larger than those of other in-phase points.

In the first CDMA communication system, each of the N phase tracking circuits may comprise an in-phase point detection circuit for detecting in-phase points and amounts of an output of the correlation detector thereof and the CDMA communication system may further comprise a comparing and selection circuit including: a max detector for detecting one of the in-phase points from the N phase tracking circuits having a largest amount of the outputs of the N correlation detectors; a reference level generation circuit for generating a reference level from a predetermined ratio and the largest amount; a comparing circuit for comparing amounts of the outputs of the N correlation detectors at the in-phase points with the reference level; and a generation circuit for generating the phase information including the in-phase points showing that the amounts of the outputs of the N correlation detectors are larger than the reference level.

In the first CDMA communication system, each of the N phase tracking circuits may comprise an in-phase point detection circuit for detecting in-phase points in an output of the correlation detector thereof and the CDMA communication system further comprises a comparing and selection circuit including: a max detection circuit for detecting one of the in-phase points from the N phase tracking circuits having a largest amount of the outputs of the N correlation detectors; a reference level generation circuit for generating a reference level from a predetermined ratio and the largest amount; a comparing circuit for comparing amounts of the outputs of the N correlation detectors at the in-phase points with the reference level; and a generation circuit for generating the phase information of a predetermined number of the in-phase points showing that the amounts of the outputs of the N correlation detectors are larger than those of other in-phase points and larger than the reference level.

In the second CDMA communication system, each of the N phase tracking circuits may comprise an in-phase point detection circuit for detecting in-phase points in an output of the correlation detector thereof, and the CDMA communication system may further comprise a comparing circuit for comparing amounts of the outputs of the N correlation detectors, and a generation circuit for generating the phase information of a predetermined number of the in-phase points showing that the amounts of the outputs of the N correlation detectors are larger than those of other in-phase points.

In the second CDMA communication system, each of the N phase tracking circuits may comprise an in-phase point detection circuit for detecting in-phase points in an output of the correlation detector thereof, and the CDMA communication system may further comprise a comparing and selection circuit including: a max detection circuit for detecting one of the in-phase points from the N phase tracking circuits having a largest amount of the outputs of the N correlation detectors; a reference level generation circuit for generating a reference level from a predetermined ratio and the largest amount; a comparing circuit for comparing amounts of the outputs at the in-phase points with the reference level; and a generation circuit for generating the phase information including the in-phase points showing that the amounts of the outputs of the N correlation detectors are larger than the reference level.

In the second CDMA communication system, each of the N phase tracking circuits may comprise an in-phase point detection circuit for detecting in-phase points in an output of the correlation detector thereof, and the CDMA communication system further comprises a comparing and selection circuit including: a max detection circuit for detecting one of the in-phase points from the N phase tracking circuits having a largest amount of the outputs of the N correlation detectors; a reference level generation circuit for generating a reference level from a predetermined ratio and the largest amount; a comparing circuit for comparing amounts of the outputs at the in-phase points with the reference level; and a generation circuit for generating the phase information of a predetermined number of the in-phase points showing that the amounts of the outputs of the N correlation detectors are larger than those of other in-phase points and larger than the reference level.

In the second CDMA communication system, each of the N phase tracking circuits may comprise a comparing circuit for comparing an output of the correlation detector with a predetermined level and an outputting circuit for outputting the phase information when a level of the output exceeds the predetermined level.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

A first embodiment of the present invention will be described.

Figure 1:
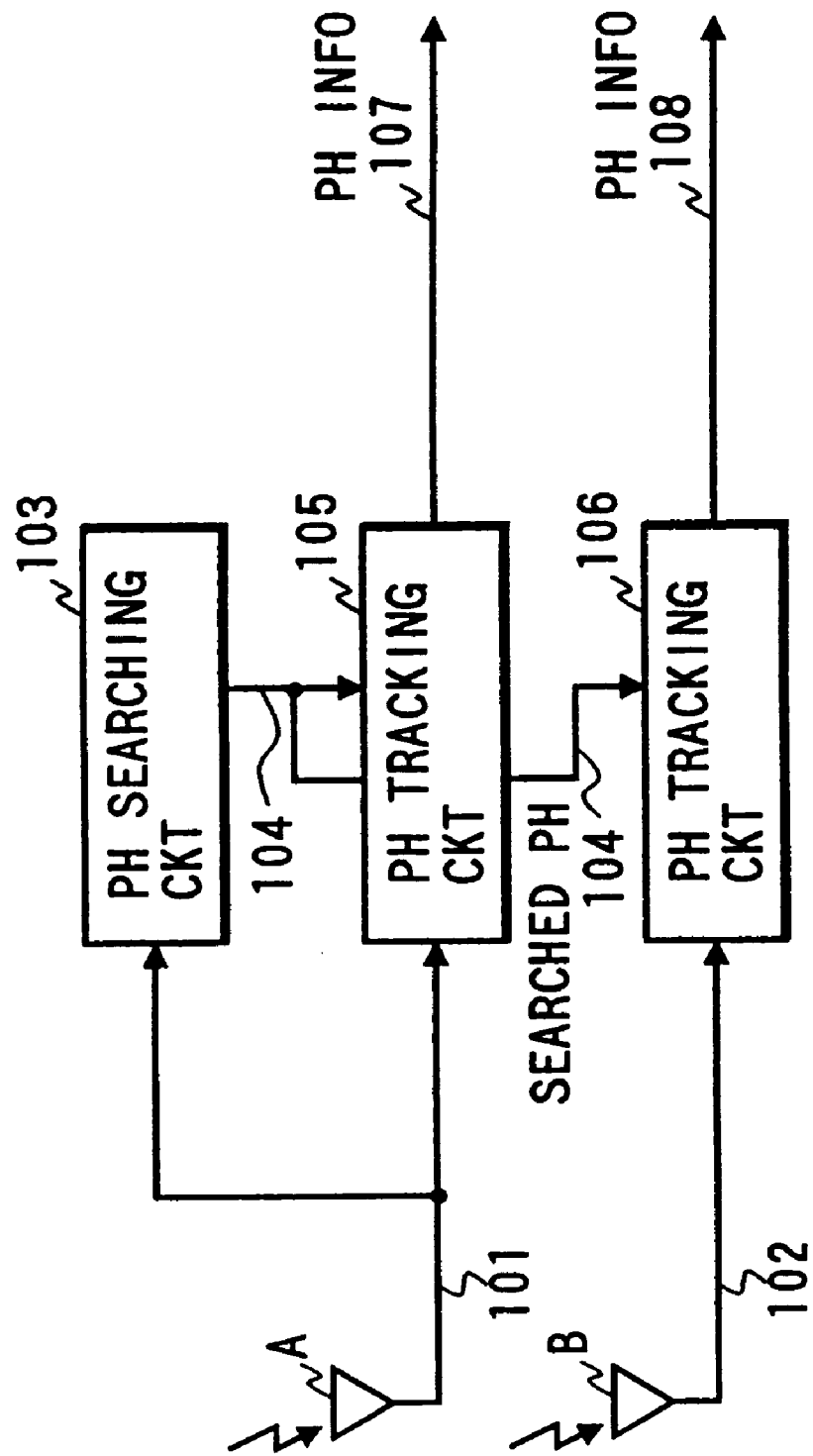
FIG. 1 is a block diagram of a synchronizing circuit of a CDMA communication system of a first embodiment.
Figure 2:
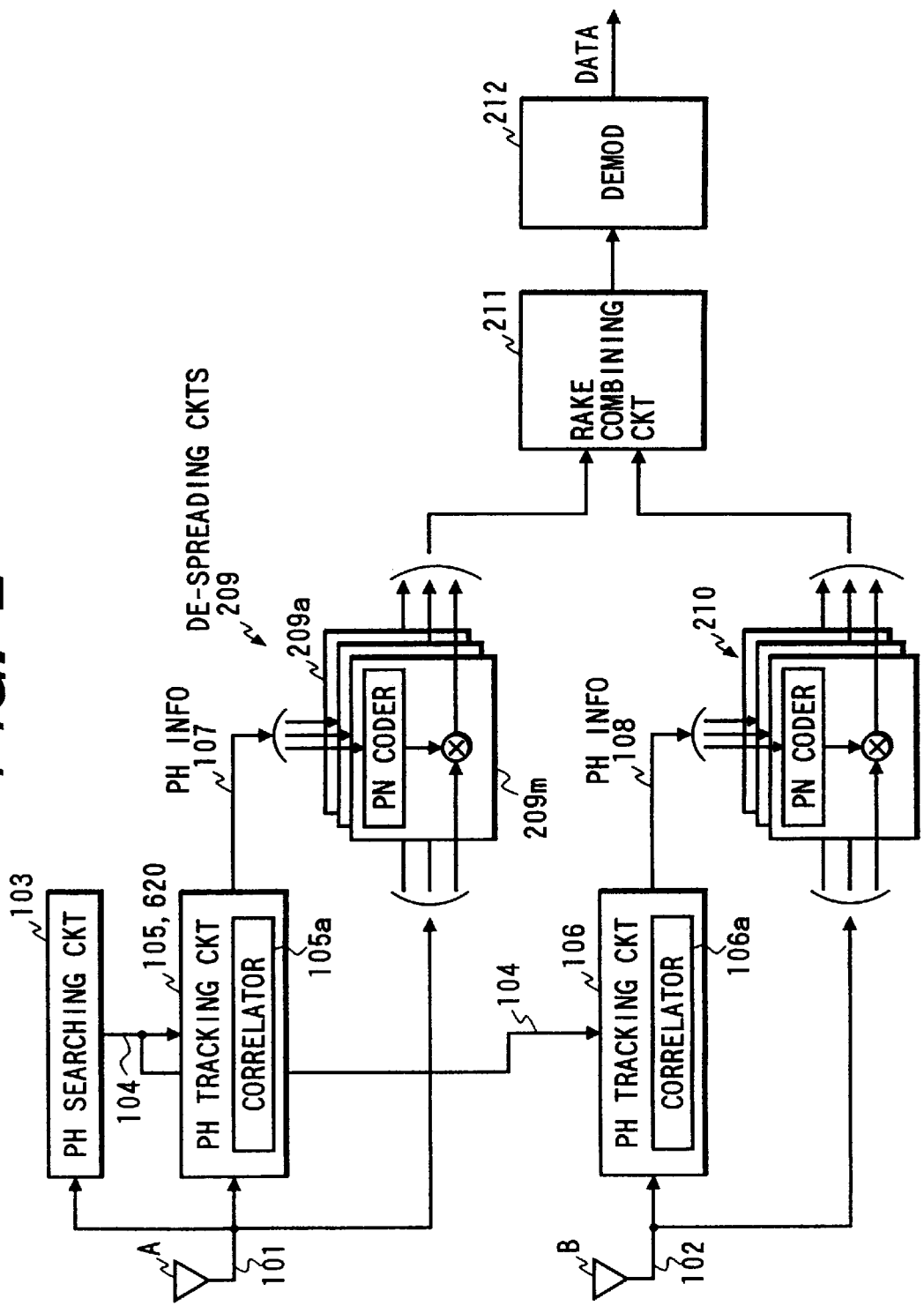
FIG. 2 is a block diagram of the CDMA communication system of this invention.

FIG. 1 is a block diagram of a synchronizing circuit of a CDMA communication system of the first embodiment. FIG. 2 is a block diagram of the CDMA communication system of this invention.

The CDMA communication system of the first embodiment comprises first and second antennas A and B, arranged for space diversity receiving, for receiving a CDMA direct conversion signal including data to generate first and second reception CDMA signals 101 and 102, a searching circuit (phase prediction circuit) 103 for searching (predicting) a phase of PN code in the first reception CDMA signal 101, first and second phase tracking circuits 105 and 106 having correlators 105a and 106a for tracking phases of the PN codes in the first and second reception CDMA signals 101 and 102 in accordance with the searched phase 104 to generate phase information 107 and 108 of the PN codes, respectively, de-spreading (inverse-spectrum-spreading) circuits 209 and 210 for de-spreading the first and second reception CDMA signals 101 and 102 from the first and second antennas A and B in accordance with the phase information 107 and 108 respectively, and a RAKE combining circuit 211 for combining outputs of the de-spreading circuits 209 and 210 to output the combined signal.

The first and second antennas A and B are arranged for space diversity receiving. That is, the first and second antennas A and B are arranged with a space such that there is no correlation among respective antennas in the fading variation and thus, the first and second antennas A and B are spaced about a half of a wavelength. Assuming that the CDMA direct conversion signal has a band of 2 MHz, one wavelength is 15 cm, so that the distance is about 7.5 cm. The searching circuit 103 roughly searches the phase of PN code in the first reception CDMA signal 101 within a predetermined range, for example ± one chip.

The first and second phase tracking circuits 105 and 106 act so as to more accurately obtain an in-phase condition. That is, the phase tracking circuit 105 measures the PN code in the reception CDMA signal with different observation time base or different phase shift amounts to confirm the in-phase condition and trace the in-phase condition. During this operation, the phase information including in-phase point of which an amount of correlation is high and the amount is provided.

Figure 4A:
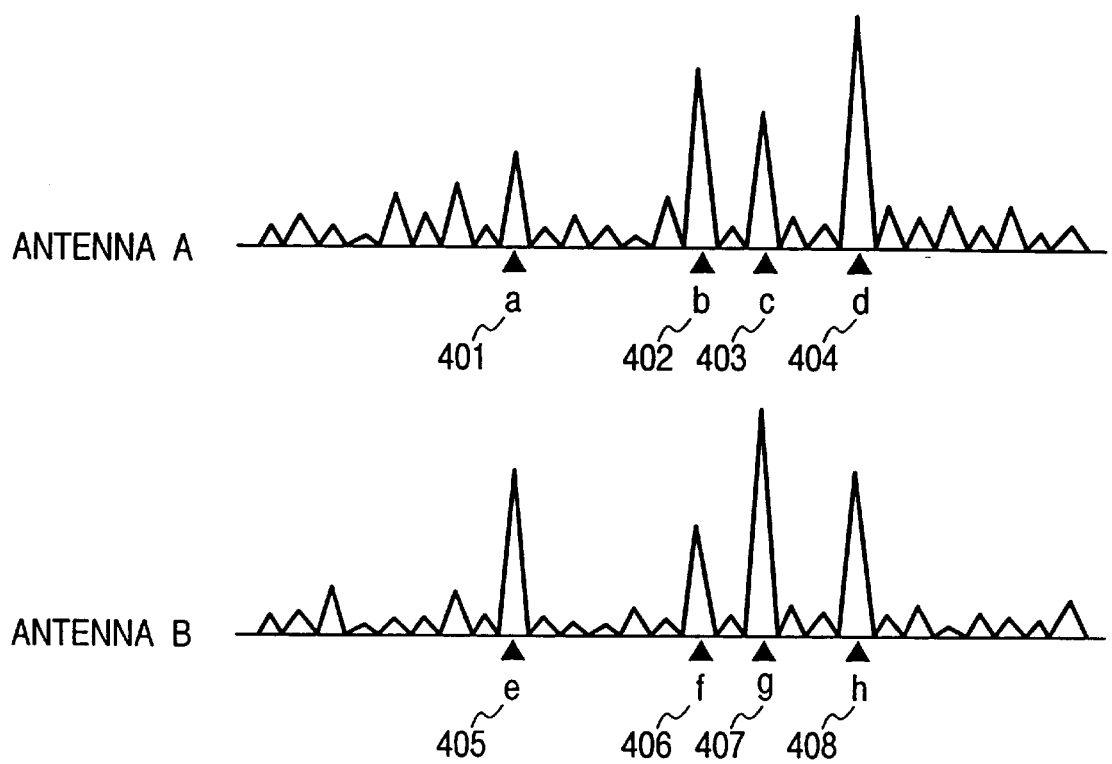
FIG. 4A is a graphical drawing of a first embodiment showing correlation outputs.
Figure 4B:
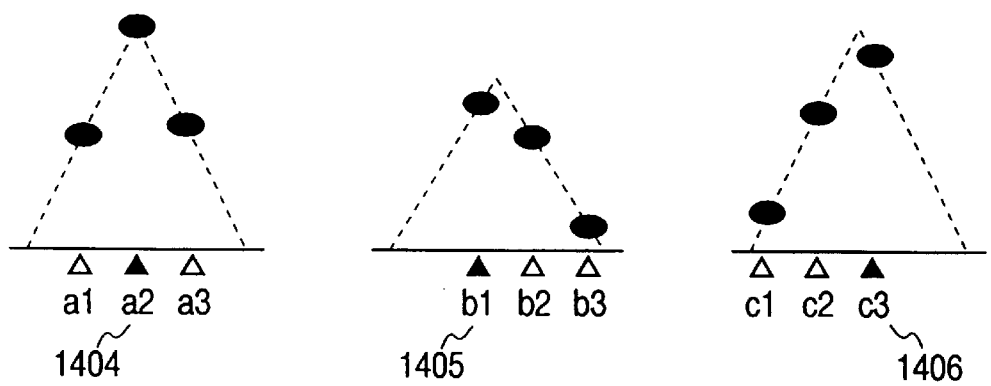
FIG. 4B is a graphical drawing of the first embodiment showing a finer correlation output

FIG. 4A is a graphical drawing of the first embodiment showing correlation outputs (delayed profiles) of the searching circuit 103 with respect to respective antennas, wherein there are four paths. In the correlation outputs, there is no difference in the profiles of antennas A and B, so that phases of respective paths are the same between the antennas A and B. The searching circuit 103 searches phases for four paths. The searching circuit 103 searches the phase a 401, phase b 402, phase c 403, and phase d 404. FIG. 4B is a graphical drawing of the first embodiment showing a finer correlation output. The tracking circuit 105 observes the correlation more accurately by varying a shift amount fine. The tracking circuit 105 generates the phase information of the in-phase points and the correlation amounts of the in-phase points.

Each of the de-spreading circuits 209 and 210 includes a plurality of correlators. The number of the correlators is determined by the number of the in-phase points detected by the searching circuit 103. In other words, the searching circuit 103 searches the in-phase points of which the number is equal to or less than the number of the correlators.

The de-spreading circuits 209 and 210 de-spread the first and second reception CDMA signals 101 and 102 from the first and second antennas A and B in accordance with the phase information 107 and 108 respectively. That is, correlators 209a–209m de-spread the first reception CDMA signal 101 from the first antenna A with respect to the in-phase points indicated by the phase information 107 respectively.

The RAKE combining circuit 211 combines outputs of the de-spreading circuits 209 and 210 such that a maximum combining ratio is provided, that is, the maximum-ratio-combining is provided to provide the path diversity. The combined signal is supplied to a demodulator 212. In the maximum-ratio-combining, the outputs of the de-spreading circuits 209 and 210 is combined with weighting. To determine the weighting coefficients, a training signal periodically transmitted is received every path and the weighting coefficients are determined such that the training signal is reproduced.

As mentioned, according to the present invention, the searching is performed by one antenna because there is no difference between the delayed profiles of the antennas in the space diversity receiving. The searched phase is supplied to the tracking circuits for every antenna. The tracking circuit accurately traces in-phase points. Therefore, the searching circuit is commonly used for the tracking circuits, so that the number of the searching circuits are reduced.

A second embodiment will be described.

Figure 3:
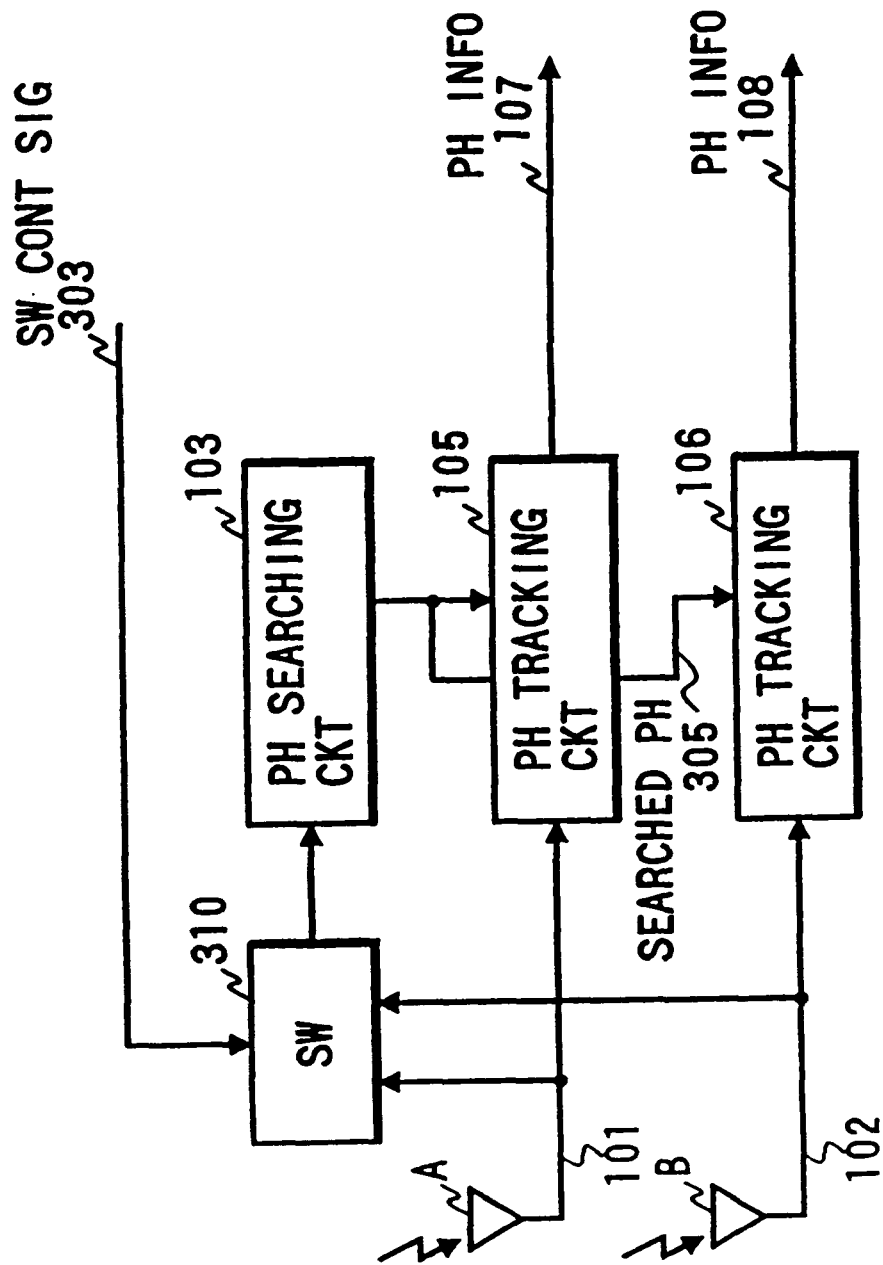
FIG. 3 is a block diagram of a synchronizing circuit of a CDMA communication apparatus of a second embodiment.

FIG. 3 is a block diagram of a synchronizing circuit of a CDMA communication apparatus of the second embodiment.

The CDMA communication apparatus of the second embodiment has substantially the same structure as that of the first embodiment. The difference is that a switch 310 is further provided. The switch 310 successively supplies either of the first CDMA reception signal 101 or the second CDMA reception signal 102 periodically in response to a switching control signal 303.

Either of the first CDMA reception signal 101 or the second CDMA reception signal 102 is supplied to the searching circuit 103 which searches the phase of the PN code in the first CDMA reception signal. The searched phase is supplied to the phase tracking circuits 105 and 106 to accurately track the in-phase points to generates the phase information 107 and 108.

In the first embodiment, in the case of a low relative speed, there is a possibility that the phase necessary for the antenna B cannot be caught if the searching performed only using the first CDMA reception signal because the delayed profile cannot be detected fully due to an insufficient observing interval because of the low speed. On the other hand, in the synchronizing circuit of the second embodiment, the input to the searching circuit 103 is periodically switched, so that a phase prediction error due to the low speed or the insufficient observing interval can be prevented.

The cycle of the switching is determined in accordance with the moving speed of the CDMA communication apparatus, a fading variation rate, and the delayed profile observing interval.

A third embodiment will be described.

Figure 5A:
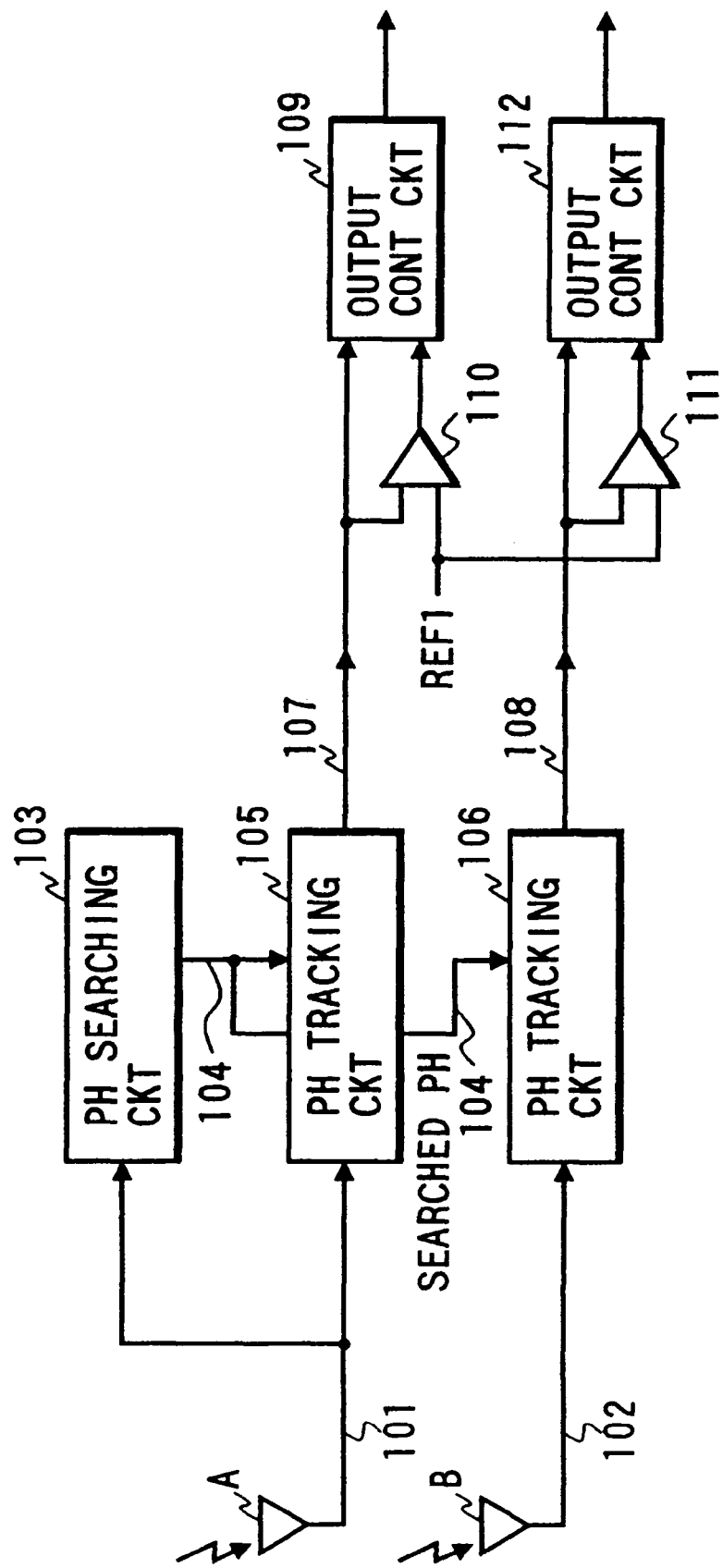
FIG. 5A is a block diagram of a synchronizing circuit of a CDMA communication apparatus of a third embodiment.

FIG. 5A is a block diagram of a synchronizing circuit of a CDMA communication apparatus of the third embodiment.

The CDMA communication apparatus of the third embodiment has substantially the same structure as that of the first embodiment. The difference is that comparators 110 and 111 and output control circuits 109 and 112 are further provided.

The comparator 110 compares the correlation amount in the phase information 107 with a reference having an absolute level. The output control circuit 109 outputs the in-phase points having the correlation amount which is larger than the reference and the correlation amount as the phase information 107. The comparator 111 and the output control circuit 112 similarly operate.

Figure 5B:
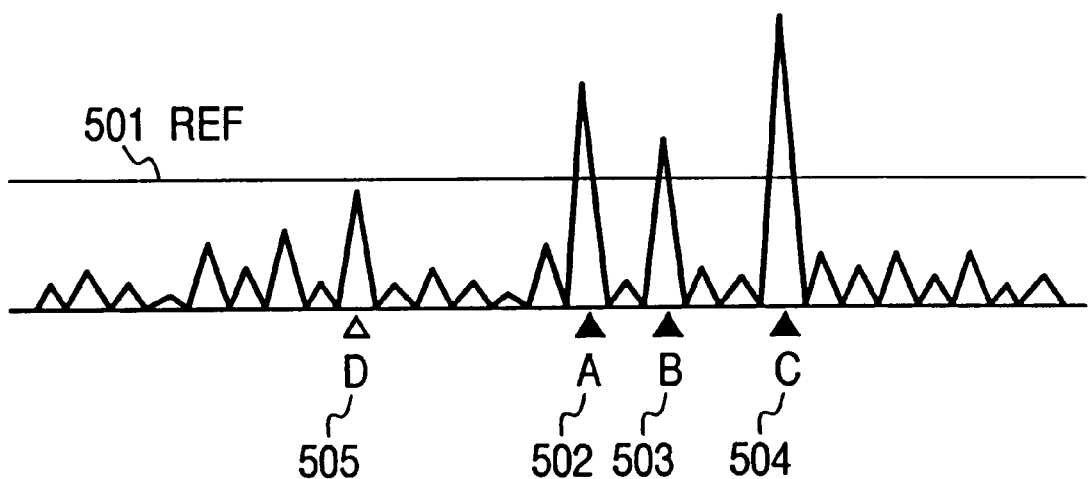
FIG. 5B is a graphical drawing of the third embodiment showing a correlation output of the phase tracking circuit.

FIG. 5B is a graphical drawing of the third embodiment showing a correlation output of the phase tracking circuit 105. The searching circuit searches four in-phase points 502 to 505 and the phase tracking circuits 105 and 106 detects the in-phase points more accurately. The output control circuits 109 and 112 output the phase information of only in-phase points 502 to 504 and correlation amounts at the in-phase points 502 to 504. In other words, the phase tracking circuits 105 and 106 do not output the phase information of the in-phase point 505.

As mentioned in the third embodiment, the in-phase point of which the correlation amount is not larger than the reference is not outputted, so that it is prevented for the phase information having a low reliability due to the fading variation or an interference from other mobile units from being used for demodulation.

The CDMA communication apparatus of the third embodiment can be modified in accordance with the second embodiment. That is, the switch 310 (FIG. 3) is provided between the antennas A and B and the searching circuit 103 shown in FIG. 5A.

A fourth embodiment will be described.

Figure 6A:
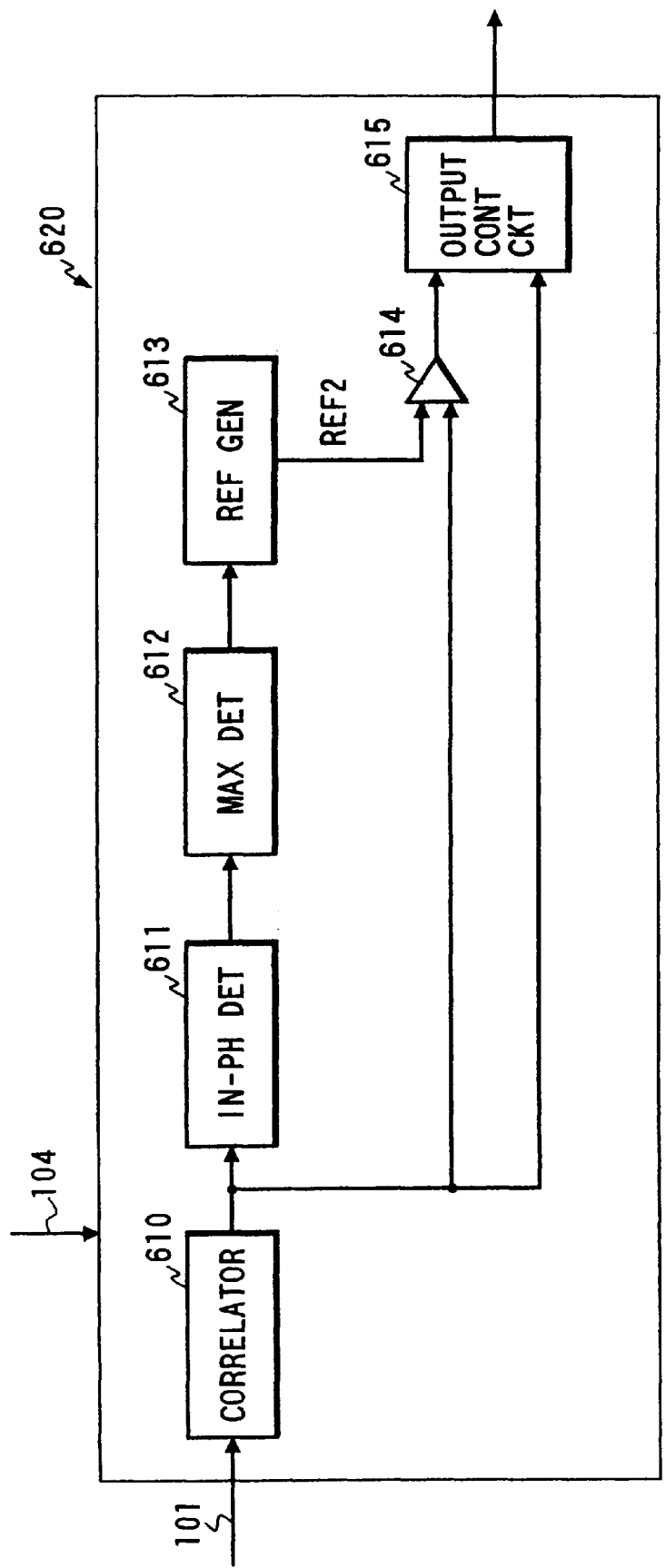
FIG. 6A is a block diagram of a synchronizing circuit of a CDMA communication apparatus of a fourth embodiment.

FIG. 6A is a block diagram of a synchronizing circuit of a CDMA communication apparatus of the fourth embodiment.

The CDMA communication apparatus of the fourth embodiment has substantially the same structure as that of the first embodiment. The difference is that the phase tracking circuits 620 are used instead the phase tracking circuits 105 and 106.

The phase tracking circuit comprises a correlator 610 for detecting a correlation in the CDMA reception signal, an in-phase point detection circuit 611 for detecting in-phase points in an output of the correlation detector, a max detector 612 for detecting one of the in-phase points having a largest amount of the output of the correlation detector 610, a reference level generator 613 for generating a reference level REF2 from a predetermined ratio and the largest amount, a comparator 614 for comparing amounts of the output at the in-phase points with the reference level REF2, and an output control circuit 615 for outputting the phase information including the in-phase points showing that the amounts of the outputs of the correlation detectors are larger than the reference level REF2. The reference level generator 613 generates the reference level REF2 from a relative ratio of 50% for example and the detected largest amount as a relative reference level.

Figure 6B:
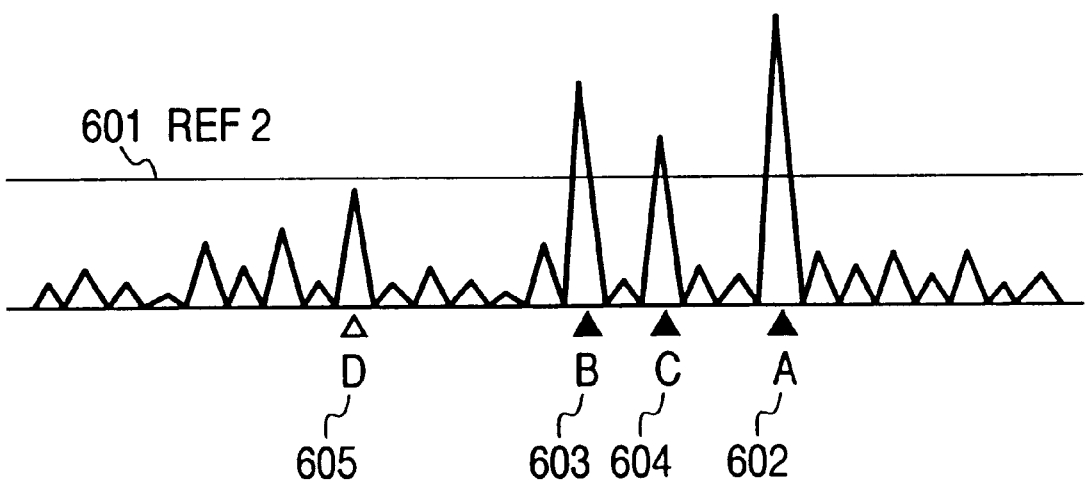
FIG. 6B is a graphical drawing of the fourth embodiment showing a correlation output of the phase tracking circuit.

FIG. 6B is a graphical drawing of the fourth embodiment showing a correlation output of the phase tracking circuit 620. The output control circuit 615 outputs the phase information of in-phase points 602 to 604 having amounts larger than the relative reference level REF2 601.

A fifth embodiment will be described.

Figure 7:
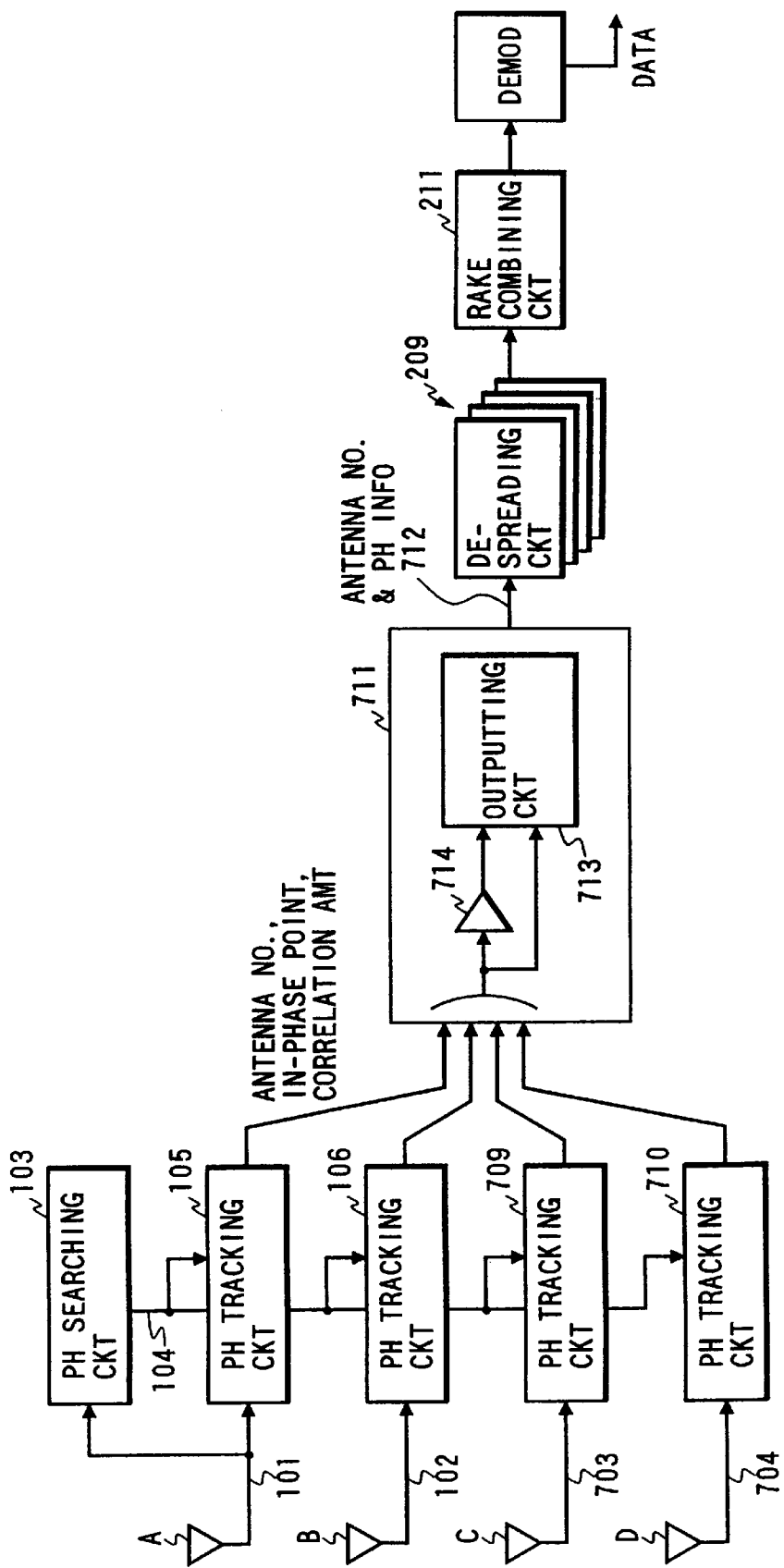
FIG. 7 is a block diagram of a synchronizing circuit of a CDMA communication apparatus of a fifth embodiment.

FIG. 7 is a block diagram of a synchronizing circuit of a CDMA communication apparatus of the fifth embodiment.

The CDMA communication apparatus of the fifth embodiment has substantially the same structure as that of the first embodiment. The difference is that the synchronizing circuit further comprises a selection circuit 711 including a comparing circuit 714 for comparing amounts of the outputs of the correlation detectors of the phase tracking circuits and an outputting circuit 713 for outputting the phase information of a predetermined number of the in-phase points showing that the amounts of the outputs of the correlation detectors are larger than those of other in-phase points.

Figure 8:
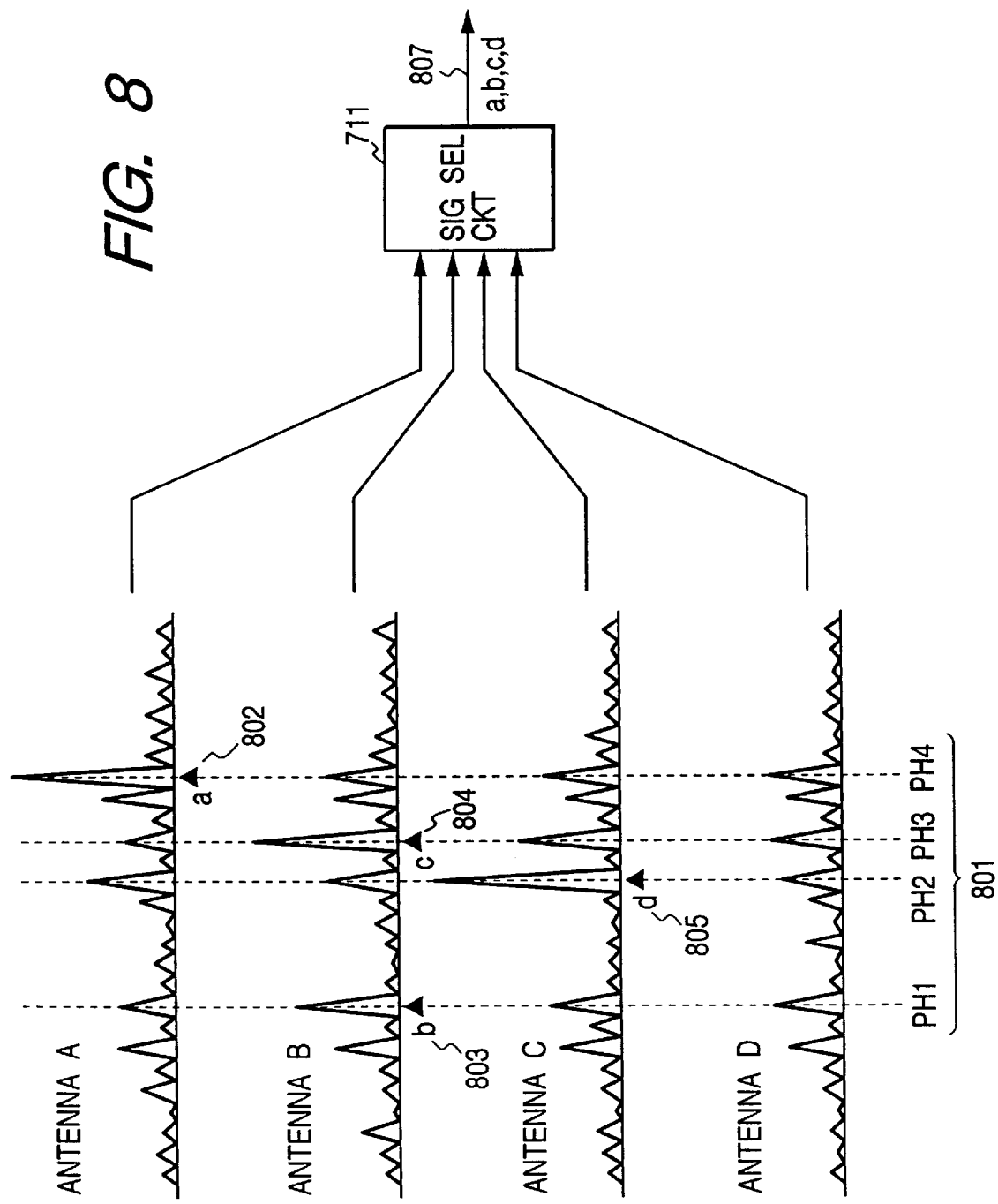
FIG. 8 is a graphical drawing of the fifth embodiment showing a correlation output of the phase tracking circuits.

FIG. 8 is a graphical drawing of the fifth embodiment showing a correlation output of the phase tracking circuits 105, 106, 709, and 710. The output circuit 713 outputs the phase information of four in-phase points 802 to 805 having amounts larger than those of other in-phase points.

As mentioned above, providing the selection circuit 711 reduces the number of the de-spreading circuits following the selection circuit 711 because the number of the de-spreading circuits is provided by a production of the number of the antennas and the number of the in-phase points to be processed.

A sixth embodiment will be described.

Figure 9:
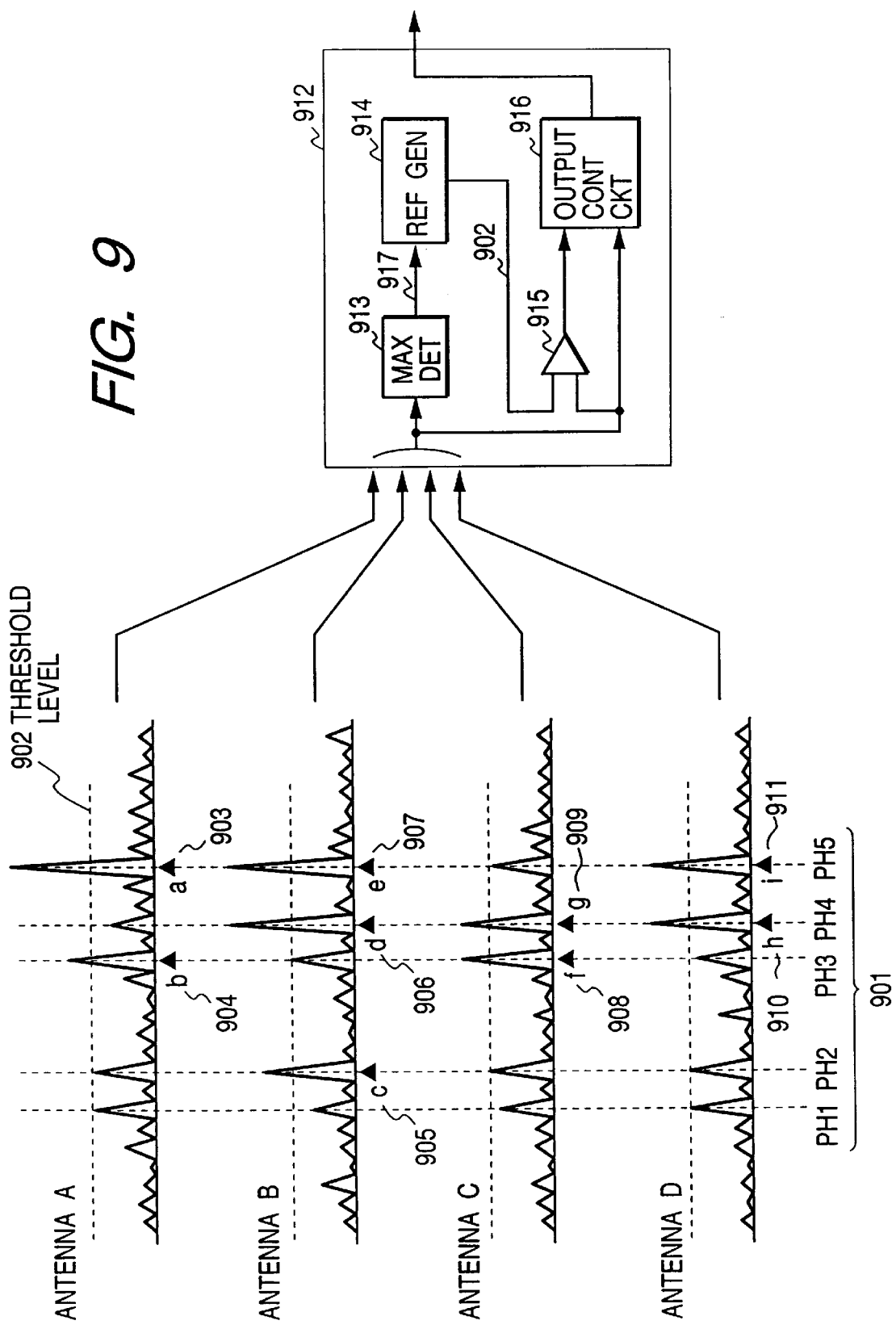
FIG. 9 is a block diagram of a selection circuit of a CDMA communication apparatus of a sixth embodiment.

FIG. 9 is a block diagram of a selection circuit of a CDMA communication apparatus of the sixth embodiment.

The CDMA communication apparatus of the sixth embodiment has substantially the same structure as that of the fifth embodiment. The difference is that the selection circuit 912 is used instead of the selection circuit 711.

The selection circuit 912 comprises a max detector 913 for detecting one of the in-phase points from the phase tracking circuits 105, 106, 709, and 710 having a largest amount 917 of the outputs of the correlation detectors in the phase tracking circuits, a reference level generation circuit 914 for generating a reference level 902 from a predetermined ratio and the largest amount 917, a comparator 915 for comparing the amounts of the outputs of the correlators at the in-phase points with the reference level 902 (threshold level), and an output control circuit 916 for outputting the phase information including the in-phase points showing that the amounts of the outputs of the correlation detectors are larger than the reference level 902.

The phase tracking circuits 105, 106, 709, and 710 trace five in-phase points PH1 to PH5 in accordance with the searched phases from the searching circuit 103. In FIG. 9, it is assumed that a peak 903 of the output of the correlator in the phase tracking circuit 105 shows the largest amount at the in-phase points PH5. The max detector 913 detects the peak 903 and supplies the amount of the correlator of the phase tracking circuit 105. The reference level generator 914 generates a threshold level 902 of a half of the peak value (−3 dB), that is, the amount at the peak 903. The comparator 915 and the output control circuit 916 outputs the phase information of the in-phase points of peaks 903 to 911.

A seventh embodiment will be described.

Figure 10:
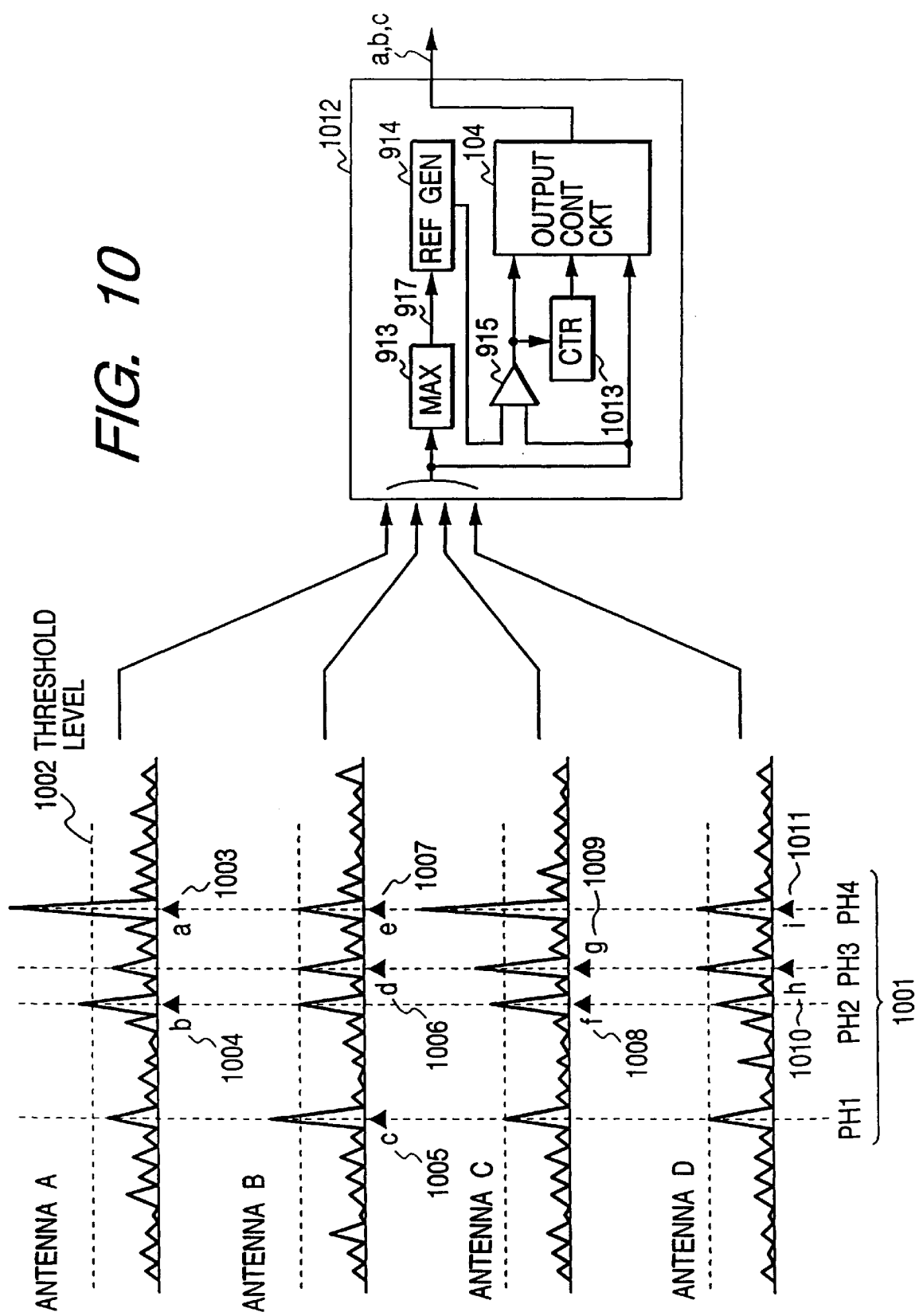
FIG. 10 is a block diagram of a selection circuit of a CDMA communication apparatus of a seventh embodiment.

FIG. 10 is a block diagram of a selection circuit of a CDMA communication apparatus of the seventh embodiment.

The CDMA communication apparatus of the seventh embodiment has substantially the same structure as that of the fifth embodiment. The difference is that the selection circuit 1012 is used instead of the selection circuit 711.

The selection circuit 1012 comprises a max detector 913 for detecting one of the in-phase points from the phase tracking circuits 105, 106, 709, and 710 having a largest amount of the outputs of the correlation detectors in the phase tracking circuits, a reference level generator 914 for generating a reference level 1002 from a predetermined ratio and the largest amount; a comparator 915 for comparing amounts of the outputs at the in-phase points with the reference level, a counter 1013 for counting the events that the amounts of the outputs at the in-phase points exceed the reference level 1002, and an output control circuit 1014 for outputting the phase information of a predetermined number (the count from the counter 1013) of the in-phase points showing that the amounts of the outputs of the correlation detectors are larger than those of other in-phase points and larger than the reference level 1002.

The phase tracking circuits 105, 106, 709, and 710 trace four in-phase points PH1 to PH4 in accordance with the searched phases from the searching circuit 103. In FIG. 10, it is assumed that a peak 1003 of the output of the correlator in the phase tracking circuit 105 shows the largest amount at the in-phase point PH4. The max detector 913 detects the peak 1003 and supplies the amount of the correlator of the phase tracking circuit 105. The reference level generator 914 generates the threshold level 1002 of a half of the peak value (−3 dB), that is, the amount at the peak 1003. The comparator 915 and the output control circuit 1014 only outputs the phase information of the in-phase points of peaks 1003, 1007, and 1009 using the counter 1013.

An eighth embodiment will be described.

Figure 11:
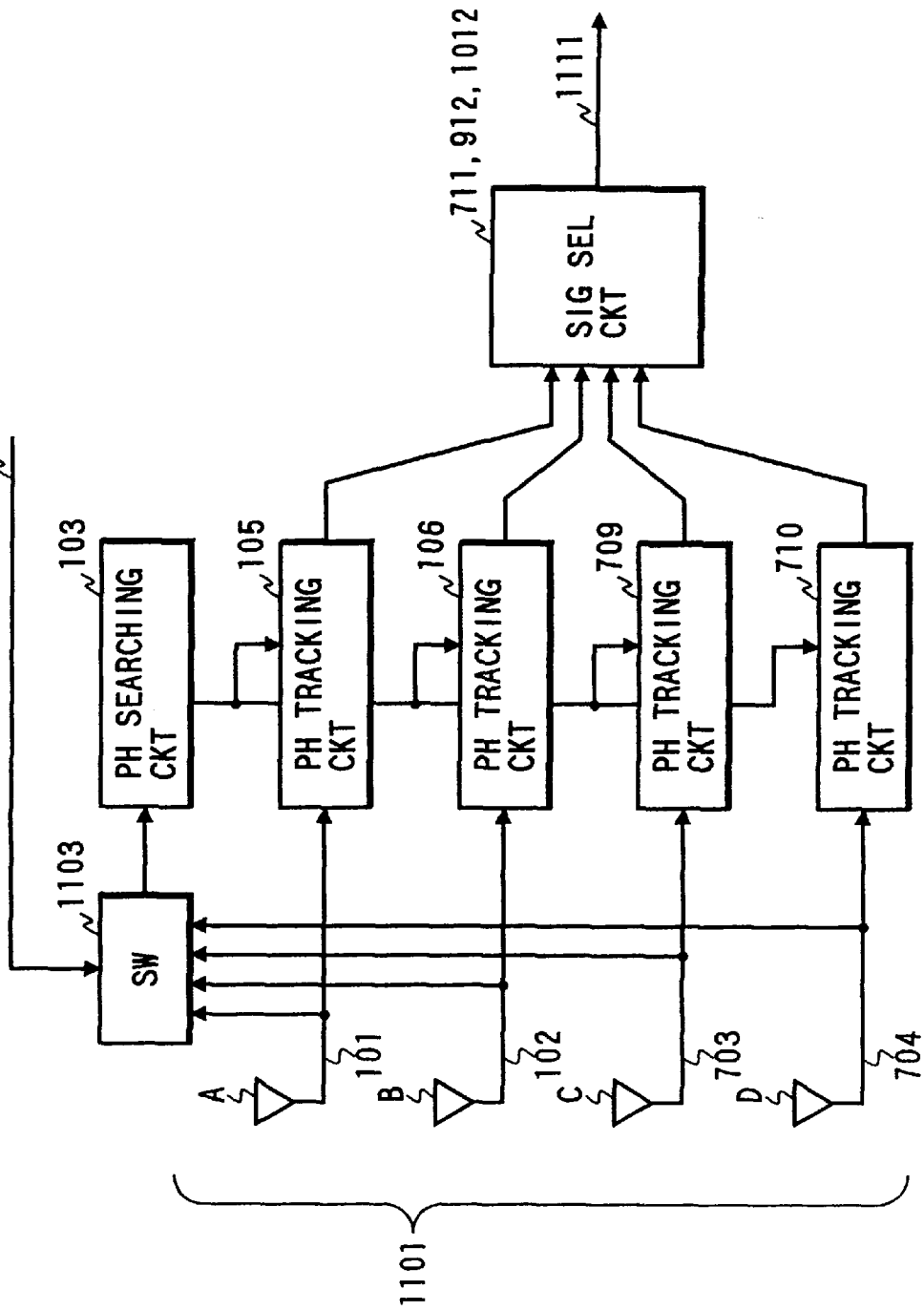
FIG. 11 is a block diagram of a synchronizing circuit of a CDMA communication apparatus of eighth to tenth embodiments.
Figure 12:
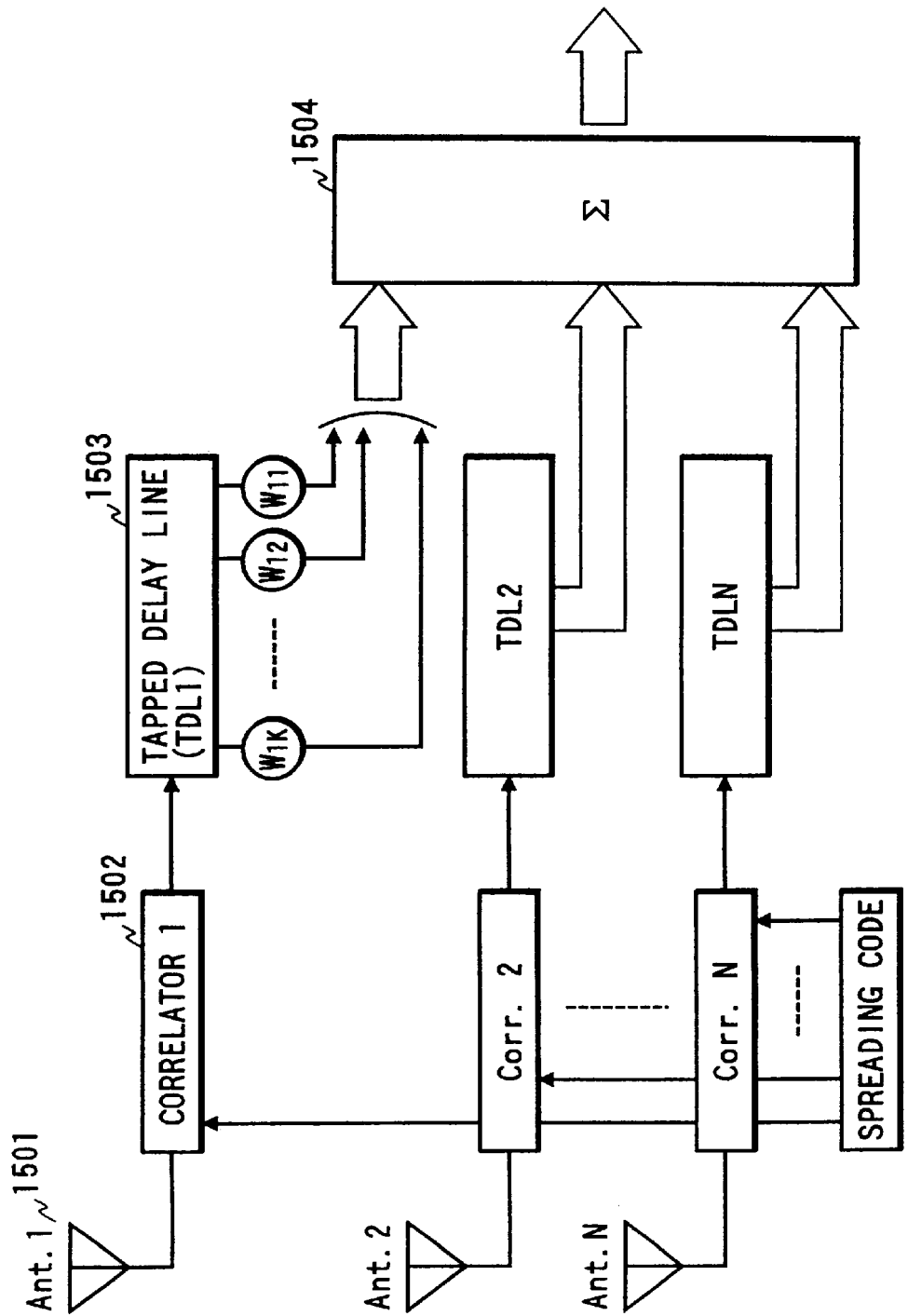
FIG. 12 is a block diagram of a prior art RAKE receiver.

FIG. 11 is a block diagram of a synchronizing circuit of a CDMA communication apparatus of the eighth embodiment which is also used in ninth and tenth embodiments.

The CDMA communication apparatus of the eighth embodiment has substantially the same structure as that of the fifth embodiment. The difference is that a switch 1103 is further provided. The switch 1103 successively supplies one of the CDMA reception signals 101, 102, 703, and 704 periodically in response to a switching control signal 1102.

One of the CDMA reception signals is supplied to the searching circuit 103 which searches the phase of the PN code in the CDMA reception signal. The searched phase is supplied to the phase tracking circuit 105, 106, 709, and 710 to accurately track the in-phase points to generate the phase information.

In the fifth embodiment, in the case of a low relative speed, there is a possibility that the phase necessary for the antennas B to D cannot be caught if the searching performed only using the first CDMA reception signal 101 because the delayed profile cannot be detected fully due to an insufficient observing interval because of the low speed. On the other hand, in the synchronizing circuit of the eighth embodiment, the input to the searching circuit 103 is periodically switched, so that a phase prediction error due to the low speed or the insufficient observing interval can be prevented.

The cycle of the switching is determined in accordance with the moving speed, a fading variation rate, and the delayed profile observing interval.

A ninth embodiment will be described.

The CDMA communication apparatus of the ninth embodiment is also shown in FIG. 11.

The CDMA communication apparatus of the ninth embodiment has substantially the same structure as that of the eighth embodiment. The difference is that the selection circuit 912 used in the sixth embodiment (FIG. 9) is used instead of the selection circuit 711 of the eighth embodiment. That is, the max detector 913 shown in FIG. 9 detects the peak 903 and supplies the amount of the correlator of the phase tracking circuit 105. The reference level generator 914 generates a threshold level 902 of a half of the peak value (−3 dB), that is, the amount at the peak 903. The comparator 915 and the output control circuit 916 outputs the phase information of the in-phase points of peaks 903 to 911.

A tenth embodiment will be described.

The CDMA communication apparatus of the tenth embodiment is also shown in FIG. 11.

The CDMA communication apparatus of the tenth embodiment has substantially the same structure as that of the eighth embodiment. The difference is that the selection circuit 1012 used in the seventh embodiment is used instead of the selection circuit 711 of the eighth embodiment. That is, the max detector 913 shown in FIG. 10 detects the peak 1003 and supplies the amount of the correlator of the phase tracking circuit 105. The reference level generator 914 generates a threshold level 1002 of a half of the peak value (−3 dB), that is, the amount at the peak 1003. The comparator 915 and the output control circuit 1014 only outputs the phase information of the in-phase points of peaks 1003, 1007, and 1009 using the counter 1013.

What is claimed is:

1. A CDMA communication system comprising:

N antennas, arranged for space diversity receiving, for receiving a CDMA direct conversion radio wave signal including data to respectively generate N reception CDMA signals, said N being a natural number;

searching means for searching a phase of PN code in one of said N reception CDMA signals;

N phase tracking means having N correlation detectors for tracking phases of the PN codes in said N reception CDMA signals in accordance with the searched phase to generate phase information of said PN codes, respectively;

N de-spreading means for de-spreading said N reception CDMA signals in accordance with said phase information, respectively; and diversity combining means for combining outputs of said N de-spreading means to provide said space diversity receiving to output the combined signal.

2. The CDMA communication system as claimed in claim 1, further comprising switching means for successively selecting one of said N reception CDMA signals periodically and supplying said one of said N reception CDMA direct conversion signals to said searching means.

3. The CDMA communication system as claimed in claim 1, wherein each of said N phase tracking means comprises comparing means for comparing an output of said correlation detector thereof with a predetermined level and outputting means for outputting said phase information when a level of said output exceeds said predetermined level.

4. The CDMA communication system as claimed in claim 1, wherein each of said N phase tracking means comprises in-phase point detection means for detecting in-phase points in an output of said correlation detector thereof, a max detector for detecting one of said in-phase points having a largest amount of said output of said correlation detector thereof, reference level generation means for generating a reference level from a predetermined ratio and said largest amount, comparing means for comparing amounts of said output of said correlation detector thereof at said in-phase points with said reference level, and outputting means for generating said phase information including said in-phase points showing that said amounts of said outputs of said correlation detectors are larger than said reference level.

5. The CDMA communication system as claimed in claim 1, wherein each of said N phase tracking means comprises in-phase point detection means for detecting in-phase points and amounts of an output of said correlation detector thereof, said CDMA communication system further comprising comparing means for comparing said amounts of said outputs of said correlation detectors of said N phase tracking means, and outputting means for outputting said phase information of a predetermined number of said in-phase points showing that said amounts of said outputs of said correlation detectors are larger than those of other in-phase points.

6. The CDMA communication system as claimed in claim 1, wherein each of said N phase tracking means comprises in-phase point detection means for detecting in-phase points and amounts of an output of said correlation detector thereof, said CDMA communication system further comprising comparing and selection means including:

max detection means for detecting one of said in-phase points from said N phase tracking means having a largest amount of said outputs of said N correlation detectors;

reference level generation means for generating a reference level from a predetermined ratio and said largest amount;

comparing means for comparing amounts of said outputs of said N correlation detectors at said in-phase points with said reference level; and generation means for generating said phase information including said in-phase points showing that said amounts of said outputs of said N correlation detectors are larger than said reference level.

7. The CDMA communication system as claimed in claim 1, wherein each of said N phase tracking means comprises in-phase point detection means for detecting in-phase points in an output of said correlation detector thereof, said CDMA communication system further comprising comparing and selection means including:

max detection means for detecting one of said in-phase points from said N phase tracking means having a largest amount of said outputs of said N correlation detectors;

reference level generation means for generating a reference level from a predetermined ratio and said largest amount;

comparing means for comparing amounts of said outputs of said N correlation detectors at said in-phase points with said reference level; and generation means for generating said phase information of a predetermined number of said in-phase points showing that said amounts of said outputs of said N correlation detectors are larger than those of other in-phase points and larger than said reference level.

8. The CDMA communication system as claimed in claim 2, wherein each of said N phase tracking means comprises in-phase point detection means for detecting in-phase points in an output of said correlation detector thereof, said CDMA communication system further comprising comparing means for comparing amounts of said outputs of said N correlation detectors, and generation means for generating said phase information of a predetermined number of said in-phase points showing that said amounts of said outputs of said N correlation detectors are larger than those of other in-phase points.

9. The CDMA communication system as claimed in claim 2, wherein each of said N phase tracking means comprises in-phase point detection means for detecting in-phase points in an output of said correlation detector thereof, said CDMA communication system further comprising comparing and selection means including:

max detection means for detecting one of said in-phase points from said N phase tracking means having a largest amount of said outputs of said N correlation detectors;

reference level generation means for generating a reference level from a predetermined ratio and said largest amount;

comparing means for comparing amounts of said outputs at said in-phase points with said reference level; and generation means for generating said phase information including said in-phase points showing that said amounts of said outputs of said N correlation detectors are larger than said reference level.

10. The CDMA communication system as claimed in claim 2, wherein each of said N phase tracking means comprises in-phase point detection means for detecting in-phase points in an output of said correlation detector thereof, said CDMA communication system further comprising comparing and selection means including:

max detection means for detecting one of said in-phase points from said N phase tracking means having a largest amount of said outputs of said N correlation detectors;

reference level generation means for generating a reference level from a predetermined ratio and said largest amount;

comparing means for comparing amounts of said outputs at said in-phase points with said reference level; and generation means for generating said phase information of a predetermined number of said in-phase points showing that said amounts of said outputs of said N correlation detectors are larger than those of other in-phase points and larger than said reference level.

11. The CDMA communication system as claimed in claim 2, wherein each of said N phase tracking means comprises comparing means for comparing an output of said correlation detector with a predetermined level and outputting means for outputting said phase information when a level of said output exceeds said predetermined level.

12. The CDMA communication system as claimed in claim 1, wherein said antennas are spaced apart by approximately a half wavelength of the CDMA direct conversion radio wave signal.

13. The CDMA communication system as claimed in claim 12, wherein said antennas are spaced apart by approximately 7.5 cm.

14. The CDMA communication system as claimed in claim 1, wherein said antennas are spaced apart by a predetermined distance for space diversity reception such that phases of respective paths thereof are substantially equal, thereby to reduce differences in correlation outputs thereof.

15. The CDMA communication system as claimed in claim 14, wherein said antennas are spaced apart by approximately a half wavelength of the CDMA direct conversion radio wave signal.

16. A CDMA communication system comprising:

N antennas, arranged for space diversity receiving, for receiving a CDMA direct conversion radio wave signal including data to respectively generate N reception CDMA signals, said N being a natural number greater than one;

searching means for searching a phase of PN code in one of said N reception CDMA signals;

N phase tracking means;

said searching means providing a signal representing the searched phase of the PN code in said one of said N reception CDMA signals to each of said N phase tracking means;

said N phase tracking means having N correlation detectors for tracking respective phases of the PN codes in said N reception CDMA signals in accordance with the searched phase of the PN code in said one of said N reception CDMA signals, as provided by said signal from said searching means, to generate phase information of said respective PN codes;

N de-spreading means for de-spreading said N reception CDMA signals in accordance with said phase information, respectively; and diversity combining means for combining outputs of said N de-spreading means to provide said space diversity receiving to output the combined signal.

* * * * *